United States Patent [19]

Keeler et al.

[11] Patent Number: 4,846,915

[45] Date of Patent: Jul. 11, 1989

[54] APPARATUS FOR INDEXING AND FEEDING A FITMENT WEB AND RELATED METHOD

[75] Inventors: Donald E. Keeler, Sussex; Edward Bombolevich, Ringwood, both of N.J.; Michael Sinocchi, Suffern, N.Y.

[73] Assignee: International Paper Company, Purchase, N.Y.

[21] Appl. No.: 165,647

[22] Filed: Mar. 8, 1988

[51] Int. Cl.⁴ .............................................. B32B 31/18
[52] U.S. Cl. .................................... 156/261; 156/543; 226/156
[58] Field of Search ............... 156/261, 262, 513, 514, 156/543; 226/156, 141

[56] References Cited

U.S. PATENT DOCUMENTS

| | | | |
|---|---|---|---|
| 1,668,846 | 5/1928 | Harter . | |
| 1,776,899 | 9/1930 | Hagemann | 226/156 X |
| 2,290,119 | 7/1942 | Pityo | 91/16 |
| 3,134,323 | 5/1964 | Stelling | 226/156 X |
| 3,158,522 | 11/1964 | Dreher | 156/519 |
| 3,199,756 | 8/1965 | Davy | 226/76 |
| 3,585,095 | 6/1971 | Shearhod | 156/261 X |
| 3,798,101 | 3/1974 | La Mevs | 156/261 X |
| 4,251,912 | 2/1981 | Yoshida | 29/766 |
| 4,520,673 | 6/1985 | Muller et al. | 73/623 |
| 4,625,902 | 12/1986 | Billberg | 226/2 |
| 4,705,197 | 11/1987 | Gordon et al. | 206/604 |

Primary Examiner—David Simmons
Attorney, Agent, or Firm—Walt Thomas Zielinski

[57] ABSTRACT

An apparatus which coacts with a fitment application machine to index a die cut fitment web for precise registration and sealing of fitments to carton die cut areas. The apparatus includes an indexing wheel which has a plurality of circumferentially spaced indentations which engage void areas in the web defined by the fitments upon their removal. A gear and rack assembly intermittently rotate the indexing wheel advancing the web through the fitment application machine for sealing operations. Precise adjustment and indexing of the web is effected by a locating pin which engages corresponding bores in the indexing wheel to lock the wheel at defined pre-set circumferential positions.

16 Claims, 6 Drawing Sheets

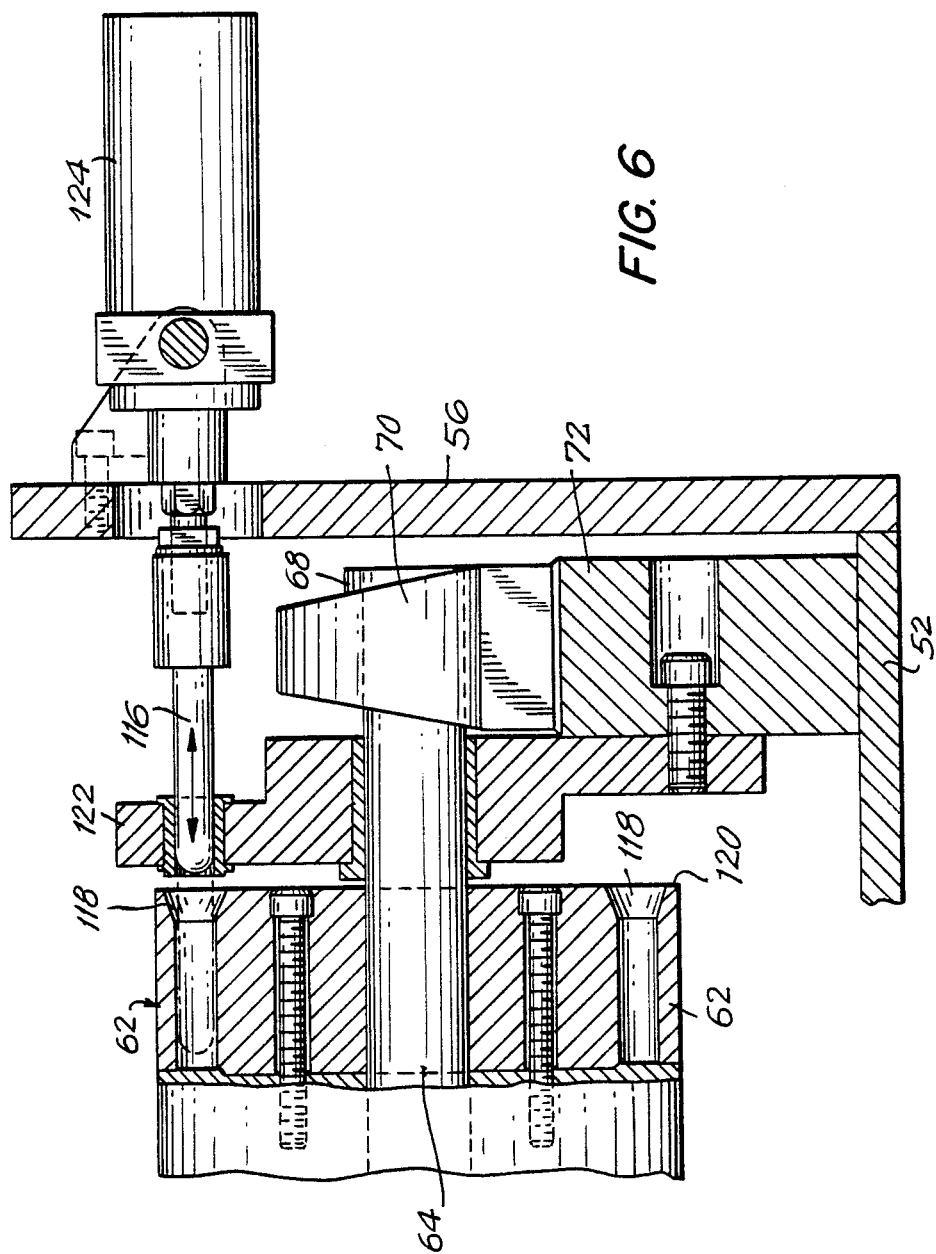

APPARATUS FOR INDEXING AND FEEDING A FITMENT WEB AND RELATED METHOD

FIELD OF INVENTION

This invention generally relates to an apparatus for indexing and driving a die cut fitment web through a fitment removal and sealing mechanism. More particularly, it is concerned with an indexing apparatus which coacts with a fitment application machine to index a web and effect precise registration of fitments to cartons or pre-side seamed blanks.

BACKGROUND ART

Conventional paperboard cartons for packaging milk and juice products are typically formed in a rectangular parallelepiped configuration and provided with gable or flat top constructions. The art has long recognized and sought to develop easy access pour spout constructions to provide ready access to product for consumer convenience. Hot fill and aseptic cartons which are hermetically sealed present a particular need for improved pour spout constructions because of their thicker gauge material specifications and design characteristics.

International Paper Company, the assignee of the present application, has developed low profile plastic pour spout fitments which may be provided in a die cut web for application to carton blanks. Each fitment is configured to form a pour spout upon removal and attachment to a carton blank. Exemplary fitment configurations within the scope of this technology are shown in U.S. Pat. No. 4,705,197 and U.S. Pat. No. 4,770,325 both to Robert L. Gordon and Roderick W. Kalberer.

In the practice of this pour spout technology, it has been found effective to advance a fitment web through a fitment application machine which includes a continuous track, and fitment removal and sealing station. A bench type sealing apparatus including a carton mandrel and horn, and ultrasonic sealing apparatus is employed to apply fitments to carton blanks. In the fitment adhering operation it is necessary to effect precise registration of the fitment with the carton blank.

Web indexing apparatus are known in the prior art, however, the art has not provided apparatus suitable for the precise registration required for application of the pour spout fitments of this invention to cartons. Typical prior art arrangements employ a web which is provided on its edges with indentations. A drive wheel including peripherally spaced sprockets engages the indentations to advance the web. As representative of such art reference may be had to U.S. Pat. Nos. 3,158,522 to J. A. Dreher and 2,290,119 to A. F. Pityo.

Another approach of the art is exemplified by U.S. Pat. No. 3,199,756 to R. E. Davy which shows an assembly for manufacturing sleeve-type containers. A continuous chain of packages is formed by sealing spaced portions of the sleeve together to define discrete compartments. Sprocket receiving apertures are provided in the sealed portions for engagement with a sprocket wheel which conveys the package chain to a cutting apparatus for severance of packages. Absent from this disclosure is a mechanism for directly interconnecting the package severing and sprocket wheel drive so as to precisely advance the package chain.

The present invention is directed to an apparatus which coacts with a fitment application machine to index a die cut fitment web for registration and sealing of fitments to carton die cut areas. Precise accuracy and tolerances in the range of ±0.005 inches are obtained in the invention to effect proper adherence of fitments. The invention advances known indexing apparatus by incorporating a direct and uncomplex mechanical coaction between a web indexing apparatus and fitment adhering mechanism. It will be recognized that such a mechanical arrangement will provide manufacturing efficiencies over known indexing apparatus.

Accordingly, it is a broad object of the invention to provide an improved indexing apparatus which provides accurate registration of die cut fitments in a web to carton blanks.

A more specific object of the invention is to provide an indexing apparatus which coacts with a fitment adhering mechanism to accurately index fitments in a die cut web.

A still further object of the invention is to provide an indexing apparatus which achieves precise mechanical indexing and registration of die cut fitments with carton blanks within a tolerance range of ±0.005 inches.

DISCLOSURE OF THE INVENTION

In the present invention, these purposes, as well as others which will be apparent, are achieved generally by providing an indexing apparatus for a die cut web including an indexing wheel which has a plurality of circumferentially spaced axial indentations, means for intermittently rotating the indexing wheel, and means for positively locking the indexing wheel at pre-set positions.

In the preferred embodiment, the intermittent rotating means includes an indexing shaft and gear wheel which are rotatably coupled to the indexing wheel. A gear rack which is reciprocably coupled to the gear wheel rotates the index wheel upon reciprocation of the gear rack. A preferred locking means includes a reciprocable locating pin which engages a corresponding bore in the indexing wheel in locking relation.

The indexing apparatus coacts with a fitment adhering mechanism which includes a sealing station to remove and seal fitments from the web to carton blanks. Web emerging from the adhering mechanism includes voids defined by framing segments corresponding to displaced fitments. These void areas engage the spaced axial indentations of the indexing wheel which function as a timing chain to advance the web to the pre-set wheel positions. Locking engagement of the locating pin and index wheel at these pre-set positions successively advances fitments in the web to positions of precise registration with carton blanks in the sealing station.

Other objects, features and advantages of the present invention will be apparent when the detailed description of the preferred embodiments of the invention are considered in conjunction with the drawings which should be construed in an illustrative and not limiting sense as follows:

BRIEF DESCRIPTION OF THE DRAWINGS

FIG. 6 is a horizontal cross-section of the indexing apparatus taken along the line 6—6 of FIG. 4.

BEST MODE OF CARRYING OUT THE INVENTION

Figure 1:
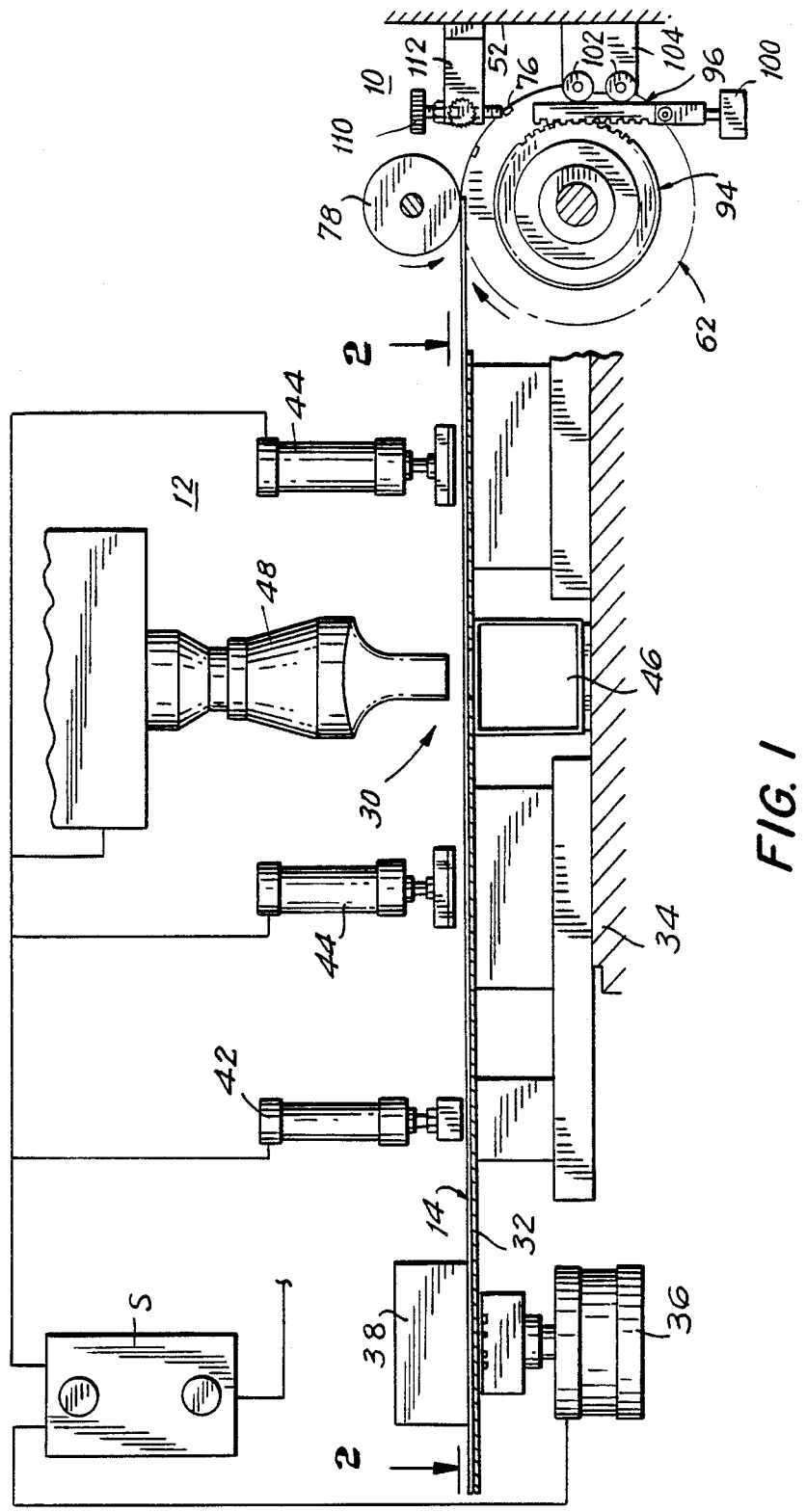
FIG. 1 is a side view of a fitment adhering mechanism in-line with an indexing apparatus of the invention showing the manner in which a die cut fitment web is indexed and advanced through a fitment sealing station.

With further reference to the drawings, a view of a preferred embodiment of the indexing apparatus 10 is shown in FIG. 1. The apparatus 10 is situated at the output end of a fitment adhering mechanism 12 to both index and drive a die cut fitment web 14 through the adhering mechanism. Prior to discussing the indexing apparatus, a brief description will be provided of the adhering mechanism 12 and die cut web 14.

Figure 2:
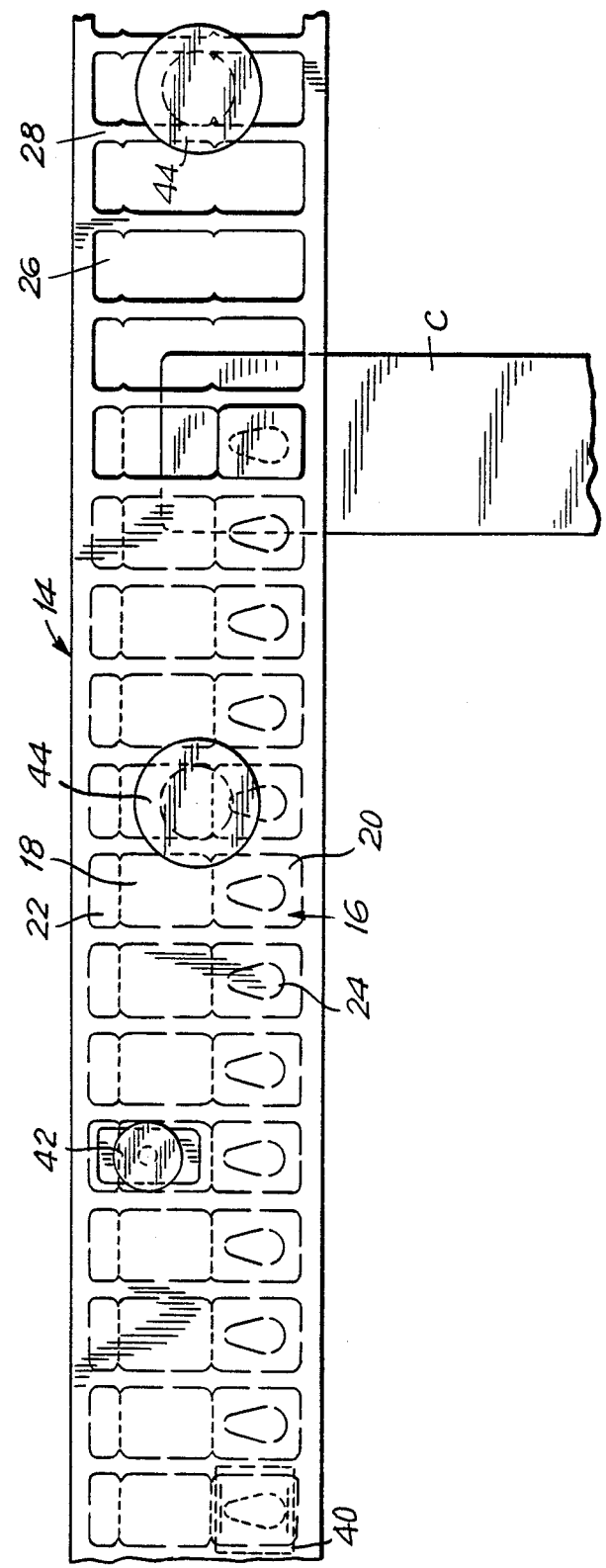
FIG. 2 is a top view of the fitment adhering mechanism showing the die cut fitment web positioned on a track and aligned by web clamping cylinders for a fitment to carton blank adhering operation.

The die cut fitment web 14, illustrated best in FIG. 2, is fabricated of a rigid plastic, such as a high density polyethylene, and includes a plurality of fitments 16 which are cut to tolerances of ±.003 inches without removal from the web for further operations. Disclosure concerning the fitment construction is set forth in U.S. Pat. No. 4,770,325, which is assigned to International Paper Company, the assignee of the present application.

Briefly, each fitment 16 includes hinged upper and lower sections 18, 20 and a tamper evidence flap 22 which is secured to the upper section. The upper section 18 is folded to overlie the lower section 20 and fused to a removable plug 24 which in turn is aligned with a corresponding die cut aperture in a carton or blank C. Lifting of the upper section 18 ruptures the removable plug 24 and die cut in the carton (not shown) to provide a dispensing opening. The flap 22 is initially sealed to a side wall of the container prior to opening to provide evidence of tampering.

For purposes of the present invention attention is directed to the void areas 26 and surrounding framing segments 28 which are formed in the web by removal of the fitments. As will be described hereinafter, the void areas 26 in the web are employed as a timing chain which engages the indexing apparatus 10 to advance the web 14 through a sealing station 30 in the fitment adhering mechanism 12.

The web 14 is conveyed on a carrier plate 32 which is supported on a base 34 through various operations, illustrated in FIG. 1, associated with sealing fitments 16 to the carton blanks. The web 14 is fed to carrier plate 32 from an unwind stand (not shown) which has a drag brake control. Upon entry on the carrier plate 32, a thermal impulse sealer 36 and mandrel 38 seal a low density polyethylene film 40 to lower fitment sections 20 of the web, see FIG. 2, which in turn correspond to the die cut aperture areas of the carton blanks. This procedure is required where the carton blanks are not extrusion coated with a barrier film in die cut areas.

A fitment pre-breaking cylinder 42 dislodges the upper section 18 of the fitment 16 from the web for inward folding and sealing to the removable plug 24 and arrangement of the lower section 20 for adherence to the die cut fitment area of the carton blank at the sealing station 30. To this end, dual action web clamping cylinders 44 are positioned at upstream and downstream locations relative to the sealing station 30. These clamping cylinders 44 secure the web in stretch position on the carrier plate 32 for the sealing operation.

At the sealing station 30 a carton mandrel 46 and ultrasonic sealer 48 coact to break the lower fitment section 20 from the web and seal it to a carton blank. In accordance with the invention, the fitment web 14 is advanced through the sealing station 30 by the timing apparatus 10 which utilizes void areas 26 in the web as a timing chain to precisely position fitments 16 in registration with fitment areas of the carton blanks at the sealing station.

MECHANISM OF THE INDEXING APPARATUS

Referring now specifically to the mechanism of the indexing apparatus 10, this unit includes a frame 50 which supports numerous components of the apparatus. The frame 50 includes a base plate 52, spaced side plates 54, 56, a rear wall 58, and a pivot shaft 60 which is spaced from the base plate 52 and mounted to the side plates 54, 56.

Figure 3:
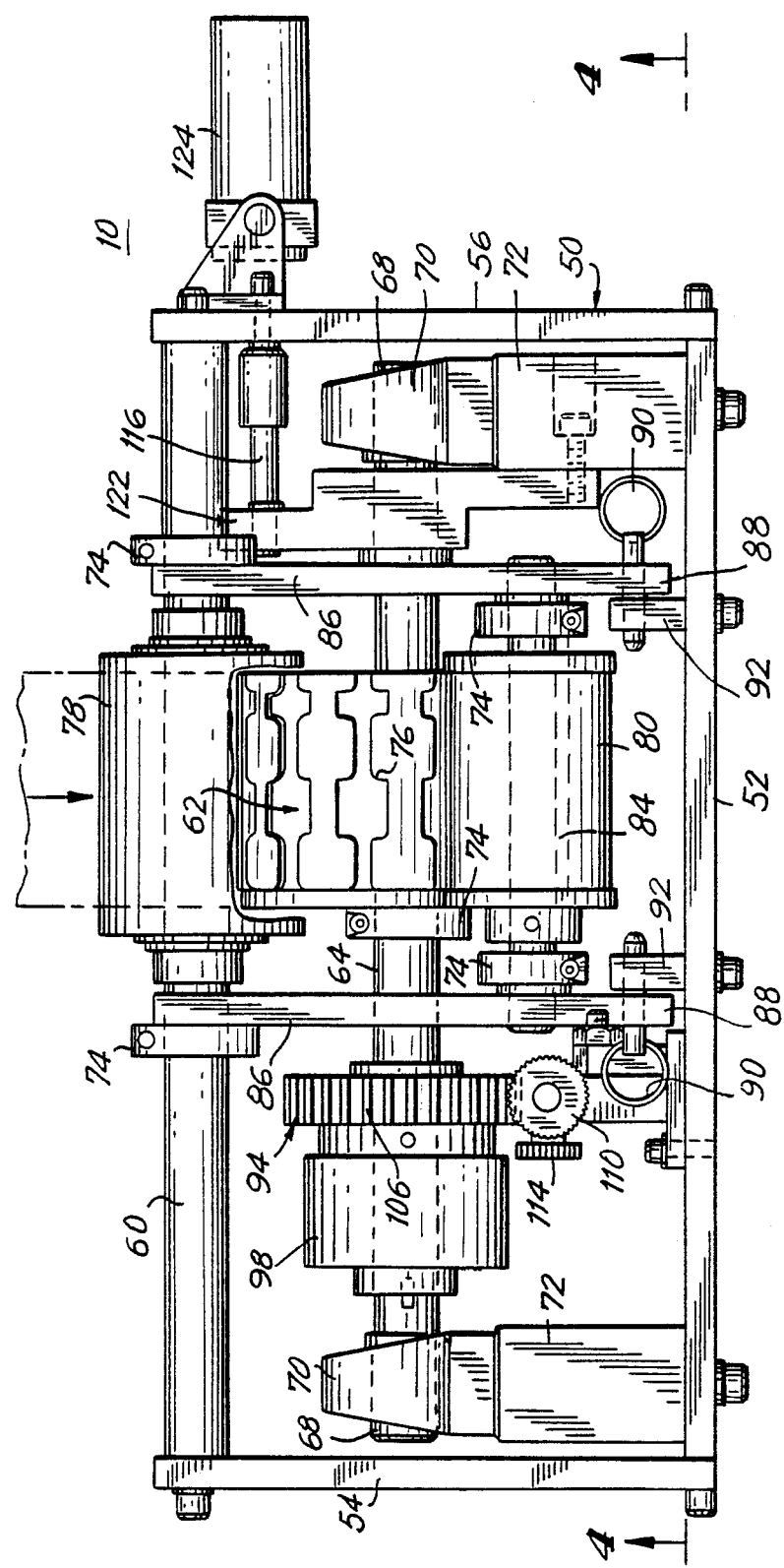
FIG. 3 is a top plan view of the indexing apparatus showing the manner in which voids in the web engage an indexing wheel.

Mounted centrally within the indexing apparatus 10 is an indexing wheel 62, shown in FIGS. 1, 3 and 5, as well as other figures later to be described. The indexing wheel 62 is mounted for rotation on an indexing shaft 64 which extends through a central shaft opening 66 in the indexing wheel. Opposing ends 68 of the indexing shaft 64 are journaled in pillow block bearings 70 which in turn are supported by spacer bearings 72 mounted on the base plate 52. A clamping collar 74 secures the indexing wheel 62 on the shaft 64 against axial movement.

The indexing wheel 62 is provided with a plurality of circumferentially spaced axial indentations or sprockets 76 on its pheriphery which are configured to engage void areas 26 in the fitment web 14. See FIGS. 1 and 3. The web 14 is carried to and from the indexing wheel 62 by first and second idler rollers 78, 80 which are respectively mounted at up and downstream locations relative to the indexing wheel 62 for movement of the web 14 through the indexing apparatus 10, as shown in FIGS. 3 and 5. The idler rollers 78, 80 are biased against the indexing wheel 62 to apply pressure to the web 14 and maintain it in aligned engagement with the indexing wheel.

The first idler roller 78 is rotatably mounted through a central shaft opening 82 on the pivot shaft 60. The second idler roller 80 is rotatable about an idler shaft 84 coupled to idler arms 86 which are spaced outwardly from the index wheel 62. The idler arms 86 are coupled to the pivot shaft 60 and extend downwardly into the apparatus, as shown in FIG. 3, to the base plate 52. Clamping collars 74 are provided to respectively secure the idler arms 86 and second idler roller 80 in axial position relative to the pivot and idler shafts 60, 84.

Each idler arms 86 includes a terminal end 88 spaced from the base plate 52 in which there is provided a quick release pin 90 arranged for releasable engagement with a bracket 92 mounted on the base plate. This arrangement permits outward pivoting of the idler arms 86 and the second idler roller 80 about the pivot shaft 62 for feeding web 14 onto the indexing wheel 62.

The indexing wheel 62 is driven by an intermittent rotating means which advances the indexing wheel to pre-set positions. Successive movement of the indexing wheel feeds fitments 16 to the sealing station 30 in registration with the die cut areas of the carton blanks.

Figure 4:
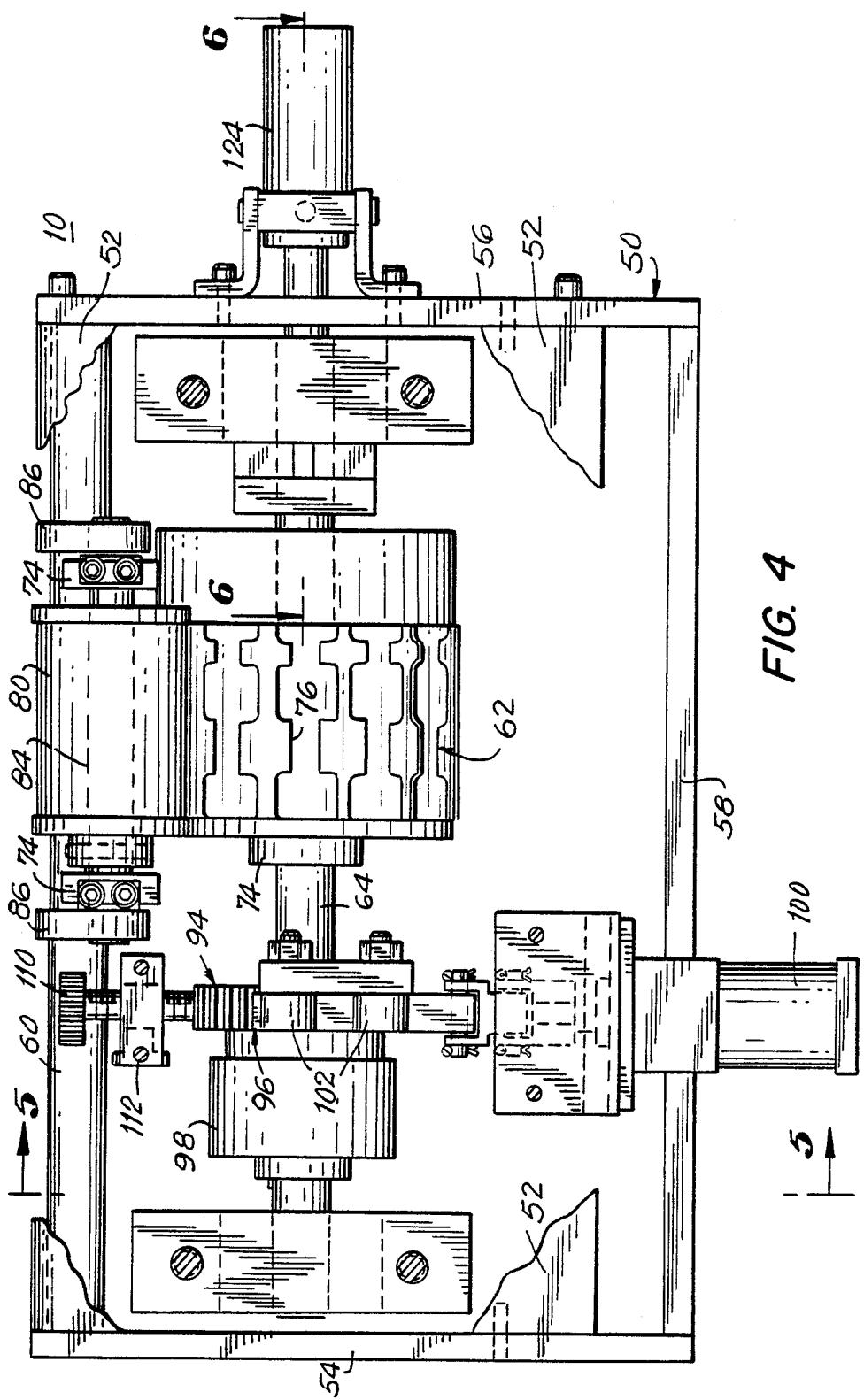
FIG. 4 is a horizontal cross-section of the indexing apparatus taken along the line 4—4 of FIG. 3.
Figure 5:
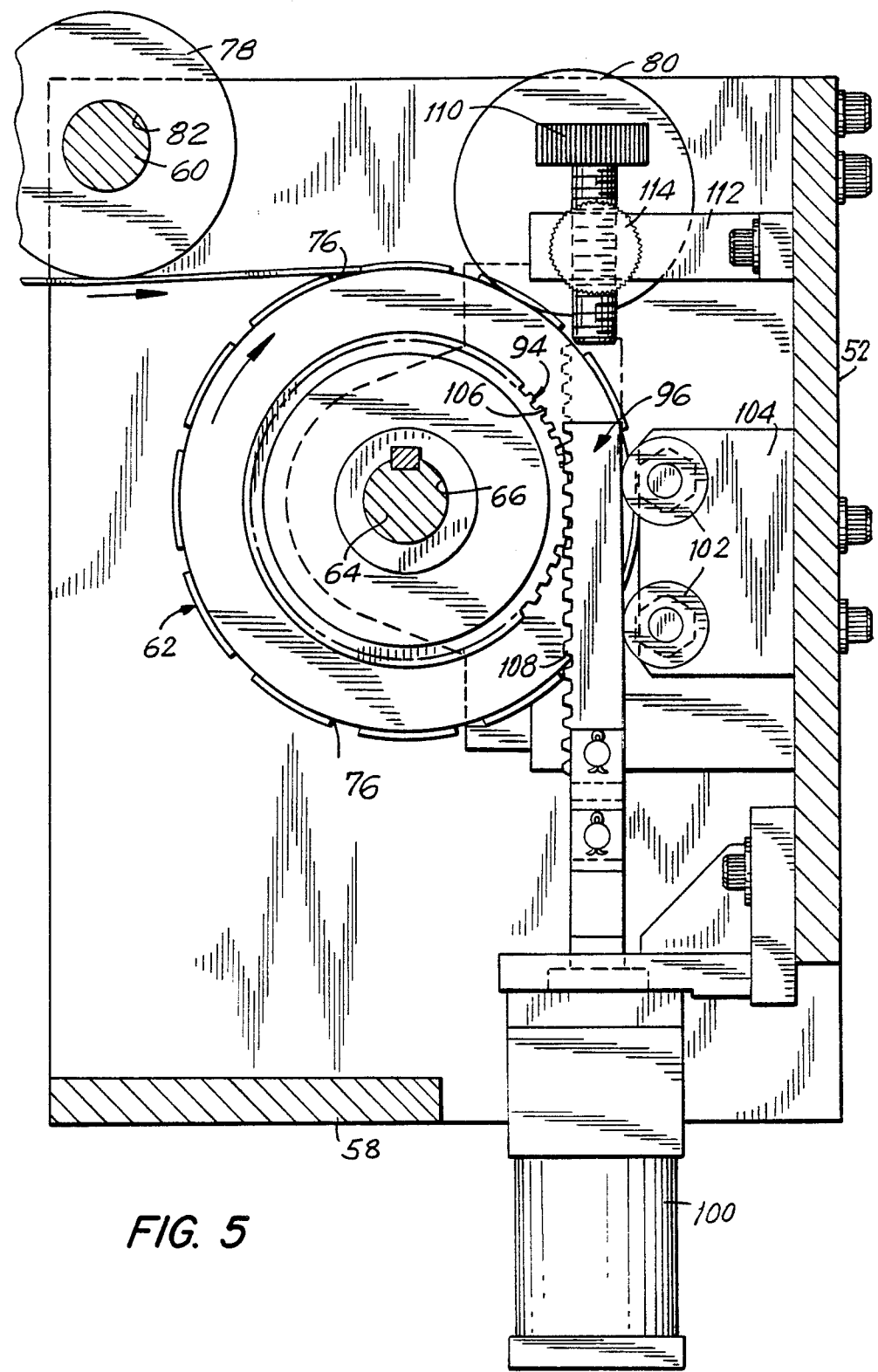
FIG. 5 is a vertical cross-section of the indexing apparatus taken along the line 5—5 of FIG. 4.

As best shown in FIGS. 4 and 5, the intermittent rotating means includes a gear wheel 94 rotatably coupled to the indexing shaft 64, a gear rack 96 which is reciprocably mounted in engagement with the gear wheel 94, and an over-running all purpose clutch 98 which rotates the indexing wheel 62 upon reciprocation of the gear rack 96. A pneumatic means, such as an air cylinder 100, is provided for reciprocation of the gear rack 96. The gear rack 96 is guided in its reciprocating movement by rollers 102, which in turn are mounted on a bearing block 104, to align engaging sprockets 106, 108 of the gear wheel 94 and rack 96. The bearing block 104 is mounted on the base plate 52.

Reciprocating movement of the gear rack 96 is controlled by an adjustable set screw 110 which is secured to the base plate 52 by a bracket 112. The set 110 screw impacts the gear rack 96 upon its upward movement to control linear displacement of the rack by the air cylinder 100. See FIGS. 1 and 5. A second set screw 114 locks set screw 110 after it is adjusted to control movement of the rack.

In order to obtain precise positioning of the indexing wheel 62 and registration of fitments 16 in the sealing station 30, locking means are provided for positively locking the indexing wheel at the pre-set positions. The locking means, shown in FIG. 6, includes a locating pin 116 which is reciprocably mounted on side plate 56 in a fixed position for engagement with corresponding bores 118 in an end wall 120 of the indexing wheel. Each bore 118 has an outwardly flared alignment opening 119. Slidable engagement of the locating pin 116 into the flared opening 119 rotates the index wheel 62 to one of the pre-set positions to center the bore 118 relative to the pin for engagement. This adjustment in the position of the index wheel 62 effects precise advancement of fitments in the sealing station.

The locating pin 116 extends through a linear bearing 122 and is reciprocated by pneumatic air cylinder 124. The bores 118 are located to permit locking of the indexing wheel at the pre-set positions for fitment application at the sealing station 30.

OPERATION OF THE INDEXING APPARATUS

The mechanical components of the indexing apparatus 10 have now been fully described, and it will be advantageous for a full understanding of the invention, to discuss the apparatus in terms of function.

The die cut fitment web 14 is advanced on a continuous carrier plate 32 through the fitment adhering mechanism 12 and received on the indexing wheel 62 where void areas 26 in the web are coupled to index wheel indentations 76. Positioning of the web 14 on the index wheel 62 is facilitated by idler arms 86 which pivot outwardly to release idler roller 80 from engagement with the indexing wheel.

A semi-automatic dual push button safety switch S, shown in FIG. 1, actuates the gear rack and wheel assembly 94, 96 which in turn rotates the indexing wheel 62 through action of the clutch 98 a pre-set circumferential distance. Linear movement of the rack 96 and consequent rotation of the indexing wheel 62 is controlled by the set screw 110. Fine adjustment of the indexing wheel position is obtained by the coaction of the gear wheel and rack assembly 94, 96 and the locating pin 116 which moves into engagement with corresponding bores 118 in the indexing wheel.

Engagement of the locating pin 116 in the indexing wheel positions a fitment 16 in the sealing station 30 in registration with a corresponding die cut aperture of a carton blank. The ultrasonic sealer 48 is then actuated to remove the fitment from the web and seal it to the carton blank. Following this sealing operation, the locating pin 116 is disengaged from the indexing wheel and the web is again advanced for further fitment adhering operations.

From the foregoing, it will be appreciated that the present invention provides an indexing apparatus 10 which achieves the objects stated heretofore. In particular, an indexing apparatus is provided which includes an indexing wheel 62 and drive mechanism which advances a fitment web 14 successive intervals through a sealing station 30 to position fitments 16 in precise registration with carton die cut areas. This result is obtained by the coaction of a rack and gear assembly 94, 96 and locating pin 116 which positively lock the indexing wheel at pre-set positions. Advantage is obtained by employing void areas 26 in the web to synchronize movement of the indexing wheel and web through a fitment sealing station 30.

Numerous modifications are possible in light of the above disclosure. For example, although a semi-automatic indexing apparatus is shown in the drawings, an automatic indexing apparatus is within the scope of the invention. Similarly, the indexing wheel of the invention is configured to accommodate a specific web configuration, the indexing wheel may be altered to the specifications of other web structures.

Therefore, although the invention has been described with reference to certain preferred embodiments, it will be appreciated that other indexing apparatus may be devised, which are nevertheless within the scope and spirit of the invention as defined by the claims appended hereto.

We claim:

1. An apparatus for indexing a die cut fitment web, said apparatus being adapted for use in-line with a carton fitment adhering mechanism which includes a sealing station at which fitments are removed from the web and attached to carton fitment areas, the web including framing segments which define voids upon removal of the fitments, said apparatus comprising:

a frame;
an indexing wheel having a plurality of circumferentially spaced axial indentations, said indexing wheel including an end wall and a first bore extending into said end wall, said first bore having an outwardly flared alignment opening;
means for feeding the web through the fitment sealing station to said indexing wheel for engagement of said framing segments with the axial indentations;
means for intermittently rotating the indexing wheel to successively advance fitments to the sealing station; and
means for positively locking said indexing wheel to position each fitment in registration with a carton fitment area, said positive locking means including a locating pin mounted on said frame for reciprocable movement into and out of engagement with said first bore, and first reciprocating means for reciprocable movement of said locating pin;
said rotating and positive locking means coacting to rotate and lock said indexing wheel at pre-set positions which successively align fitments at the sealing station in registration with the carton fitment areas.

2. An apparatus as set forth in claim 1, wherein the rotating means includes an indexing shaft rotatably coupled to said indexing wheel, a gear wheel rotatably coupled to said indexing shaft, a gear rack which is reciprocably mounted in engagement with said gear wheel, and clutch means for rotating said index wheel upon reciprocation of said gear rack.

3. An apparatus as set forth in claim 2, wherein said rotating means further includes second reciprocating means coupled to one end of the gear rack for reciprocating said gear rack, and means for adjusting the reciprocating distance of said gear rack which coacts with an other end of said gear rack.

4. An apparatus as set forth in claim 3, wherein said adusting means includes a set screw mounted on the frame for adjustable positioning and impact with the other end of the gear rack.

5. An apparatus as set forth in claim 5, wherein said positive locking means also includes a locating pin guide block which is mounted on said frame, said guide block having opposing ends and a second bore extending through said opposing ends which is aligned with said first bore, said locating pin extending through said second bore for engagement and disengagement with said first bore.

6. An apparatus as set forth in claim 15, wherein said feeding means includes first and second idler rollers which respectively carry the web to and from the indexing wheel.

7. An apparatus as set forth in claim 3, wherein said first and second reciprocating means each include reciprocating pneumatically operated rods which are respectively coupled to said locating pin and said gear rack.

8. An apparatus as set forth in claim 1, wherein:
said frame includes a pivot shaft;
said feeding means includes a first idler roller coupled to said pivot shaft which is biased in rotatable engagement with the indexing wheel, an idler arm pivotally coupled to said pivot shaft, an idler shaft coupled to said idler arm, and a second idler roller rotatably coupled to said pivot shaft and biased in rotatable engagement with said indexing wheel;
said apparatus further comprising means for releasably locking said idler arm to said frame to permit outward pivoting of said second idler roller relative to said index wheel.

9. An apparatus as set forth in claim 1, wherein:
said frame includes a base plate, opposing side plates which are coupled to terminal ends of said base plate, and a pivot shaft which is spaced from said base plate and coupled to second terminal ends of said side plates;
said indexing shaft being jounaled at opposing ends in pillow block bearings which are mounted on said base plate; and
said feeding means includes first and second idler rollers which respectively carry the web to and from the indexing wheel, said first idler roller being rotatably coupled to said pivot shaft.

10. An apparatus as set forth in claim 9, wherein said feeding means also includes idler arms pivotably coupled to said pivot shaft disposed in spaced relation with respect to opposing ends of said indexing wheel, and an idler shaft coupled between said idler arms, said second idler roller being rotatably coupled to said idler shaft.

11. An apparatus as set forth in claim 10, further comprising means for releasably locking said idler arms in engagement with said base plate to permit outward pivoting of said second idler roller for feeding the web onto the indexing wheel.

12. An apparatus as set forth in claim 11, wherein said releasable means includes a bracket mounted on said base plate, and a quick release pin which extends through aligned slots in one of the idler arms and the bracket.

13. In combination, a carton fitment adhering mechanism for removing die cut fitments from a web and attaching such fitments to carton fitment areas at a sealing station, the web including framing segments which define voids upon removal of the fitments, and an apparatus for indexing and advancing the web through the sealing station, said adhering mechanism comprising:
carrier means for carrying the web to the sealing station, said carrier means including a carrier plate;
means for sequentially removing fitments from the web at the sealing station and sealing each fitment to a carton fitment area, said removing means including a mandrel and horn situated in-line with respect to the carrier plate;
said apparatus comprising:
a frame;
an indexing wheel having a plurality of circumferentially spaced axial indentations, said indexing wheel including an end wall and a first bore extending into said end wall, said first bore having an outwardly flared alignment opening;
means for feeding the web through the fitment sealing station to said indexing wheel so that the framing segments engage said axial indentations;
means for intermittently rotating the indexing wheel to successively advance fitments to the sealing station;
means for positively locking said indexing wheel at pre-set positions which align fitments at the sealing station in registration with carton fitment areas, said positive locking means including a locating pin mounted on said frame for reciprocable movement into and out of engagement with said first bore, and first reciprocating means for reciprocable movement of said locating pin; and
means for actuating the removing means in response to the successive advancement and locking of the web to the preset positions on the index wheel.

14. The combination as set forth in claim 13, wherein the rotating means includes an indexing shaft rotatably coupled to said indexing wheel, a gear wheel rotatably coupled to said indexing shaft, a gear rack which is reciprocably mounted in engagement with said gear wheel, and clutch means for rotating said index wheel upon reciprocation of said gear rack.

15. The combination as set forth in claim 14, wherein:
said rotating means further includes second reciprocating means coupled to one end of the gear rack for reciprocating said gear rack, and means for adjusting the reciprocating distance of said gear rack which coacts with an other end of said gear rack, said adjusting means including a set screw mounted on said frame for adjustable positioning and impact with the other end of the gear rack;
said rotating and positive locking means coacting to rotate and lock said indexing wheel at pre-set positions which successively align fitments of the web at the sealing station in registration with the carton fitment areas.

16. A method for indexing a die cut fitment web and advancing the fitments to a fitment adhering mechanism for positive registration with and sealing to a carton fitment area at a sealing station, the web including framing segments which define voids upon removal of the fitments, said method comprising the steps of:

providing an indexing wheel which includes a plurality of circumferentially spaced axial indentations, an end wall, and a first bore extending into said end wall, said first bore having an outwardly flared alignment opening;

feeding the web through the fitment sealing station to said indexing wheel for engagement of said framing segments with the axial indentations;

intermittently rotating the indexing wheel to successively advance fitments to the sealing station;

providing a locating pin for reciprocable movement into and out of engagement with said first bore;

reciprocating said locating pin into and out of engagement with said first bore to lock said indexing wheel at pre-set positions which successively align fitments at the sealing station in registration with the carton fitment areas; and removing the fitment from the web for attachment to the carton upon registration of the fitment with the carton fitment area.

* * * * *